(12) United States Patent
Craik et al.

(10) Patent No.: US 11,397,568 B2
(45) Date of Patent: Jul. 26, 2022

(54) ESCAPE ANALYSIS SUPPORT FOR METHOD REDEFINITION

(71) Applicant: International Business Machines Corporation, Armonk, NY (US)

(72) Inventors: Andrew James Craik, North York (CA); Vijay Sundaresan, North York (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/931,011

(22) Filed: May 13, 2020

(65) Prior Publication Data

US 2021/0173622 A1 Jun. 10, 2021

Related U.S. Application Data

(60) Provisional application No. 62/946,266, filed on Dec. 10, 2019.

(51) Int. Cl.
| | |
|---|---|
| *G06F 8/41* | (2018.01) |
| *G06F 9/455* | (2018.01) |
| *G06F 8/656* | (2018.01) |
| *G06F 11/36* | (2006.01) |
| *G06F 9/448* | (2018.01) |

(52) U.S. Cl.
CPC .......... *G06F 8/4441* (2013.01); *G06F 8/4434* (2013.01); *G06F 9/45516* (2013.01); *G06F 8/656* (2018.02); *G06F 9/4488* (2018.02); *G06F 11/362* (2013.01); *G06F 11/3664* (2013.01)

(58) Field of Classification Search
CPC .. G06F 8/4434; G06F 9/44589; G06F 9/4484; G06F 12/0253; G06F 9/4488; G06F 9/44516; G06F 11/302; G06F 11/362; G06F 11/3644; G06F 2201/865
See application file for complete search history.

(56) References Cited

U.S. PATENT DOCUMENTS

| | | | |
|---|---|---|---|
| 6,865,730 B1 * | 3/2005 | Burke | G06F 9/4491 717/116 |
| 7,076,773 B2 | 7/2006 | Schmidt | |

(Continued)

OTHER PUBLICATIONS

"Escape Analysis in Java". Jan. 19, 2018. Beyond Java. URL: <https://www.beyondjava.net/escape-analysis-java> (Year: 2018).*

(Continued)

*Primary Examiner* — Lewis A Bullock, Jr.
*Assistant Examiner* — Gilles R Kepnang
(74) *Attorney, Agent, or Firm* — Garg Law Firm, PLLC; Rakesh Garg; Michael O'Keefe

(57) ABSTRACT

An embodiment performs escape analysis of a function as a compiler optimization and stack-allocates an object referenced by the function. At runtime, the embodiment includes detecting a hot code replacement of a portion of the function while the referenced object is stored in stack memory. Responsive to detecting the hot code replacement, the embodiment includes allocating heap memory for the object and moving the object from the stack memory to the allocated heap memory. The embodiment also updates references to the object that were pointing to the object in the stack memory to instead point to the object in the heap memory.

13 Claims, 14 Drawing Sheets

(56) References Cited

U.S. PATENT DOCUMENTS

| | | | |
|---|---|---|---|
| 8,127,282 B2 | 2/2012 | Slattery | |
| 8,453,132 B2 | 5/2013 | Mannarswamy et al. | |
| 8,997,040 B2* | 3/2015 | Zinkovsky | G06F 9/45516 717/106 |
| 9,009,691 B1* | 4/2015 | Chen | G06F 8/4443 717/151 |
| 2004/0015920 A1* | 1/2004 | Schmidt | G06F 9/449 717/153 |
| 2005/0080980 A1* | 4/2005 | Wu | G06F 9/44589 711/1 |
| 2005/0138611 A1* | 6/2005 | Inglis | G06F 9/4491 717/151 |
| 2006/0005171 A1* | 1/2006 | Ellison | G06F 8/656 717/131 |
| 2008/0005727 A1* | 1/2008 | Morris | G06F 9/44521 717/153 |
| 2008/0120595 A1* | 5/2008 | O'Farrell | G06F 8/41 717/106 |
| 2008/0127143 A1* | 5/2008 | Lagergren | G06F 8/4441 717/148 |
| 2008/0148246 A1* | 6/2008 | Lagergren | G06F 8/4441 717/148 |
| 2009/0172652 A1* | 7/2009 | Simon | G06F 8/443 717/148 |
| 2009/0307431 A1* | 12/2009 | Garst, Jr. | G06F 9/4484 711/132 |
| 2010/0077163 A1* | 3/2010 | Ugawa | G06F 12/0269 711/162 |
| 2010/0153911 A1* | 6/2010 | Porras | G06F 8/443 717/106 |
| 2012/0124018 A1* | 5/2012 | Horii | G06F 9/45504 707/693 |
| 2012/0311552 A1* | 12/2012 | Dinn | G06F 9/45525 717/154 |
| 2013/0311980 A1* | 11/2013 | Cabillic | G06F 9/45516 717/148 |
| 2014/0040860 A1* | 2/2014 | Darcy | G06F 8/437 717/114 |
| 2015/0278069 A1* | 10/2015 | Arora | G06F 11/3466 717/130 |
| 2018/0203786 A1* | 7/2018 | Marron | G06F 11/3664 |

OTHER PUBLICATIONS

Kotzmann, Thomas et al. "Run-time support for optimizations based on escape analysis." International Symposium on Code Generation and Optimization (CGO'07). IEEE, 2007. (Year: 2007).*

Bebenita et al., Stream-Based Dynamic Compilation for Object-Oriented Languages, Tools Europe 2009: Objects, Components, Models and Patterns, 2009, pp. 77-95, https://link.springer.com/chapter/10.1007/978-3-642-02571-6_6.

* cited by examiner

*FIGURE 7B*

```
obj = new A();
...
if (check that foo has not been redefined)
    foo(obj); // call can be peeked
else
    foo(obj); // call marked cold and cannot be peeked
...
```

*FIGURE 7C*

```
obj = stack allocated object of A
...
if (check that foo has not been redefined)
  foo(obj); // call can be peeked
else
{
  obj = new A() and copy from the stack allocated object into the newly allocated object on the heap before it escapes
  foo(obj); // call marked cold and cannot be peeked
}
...
```

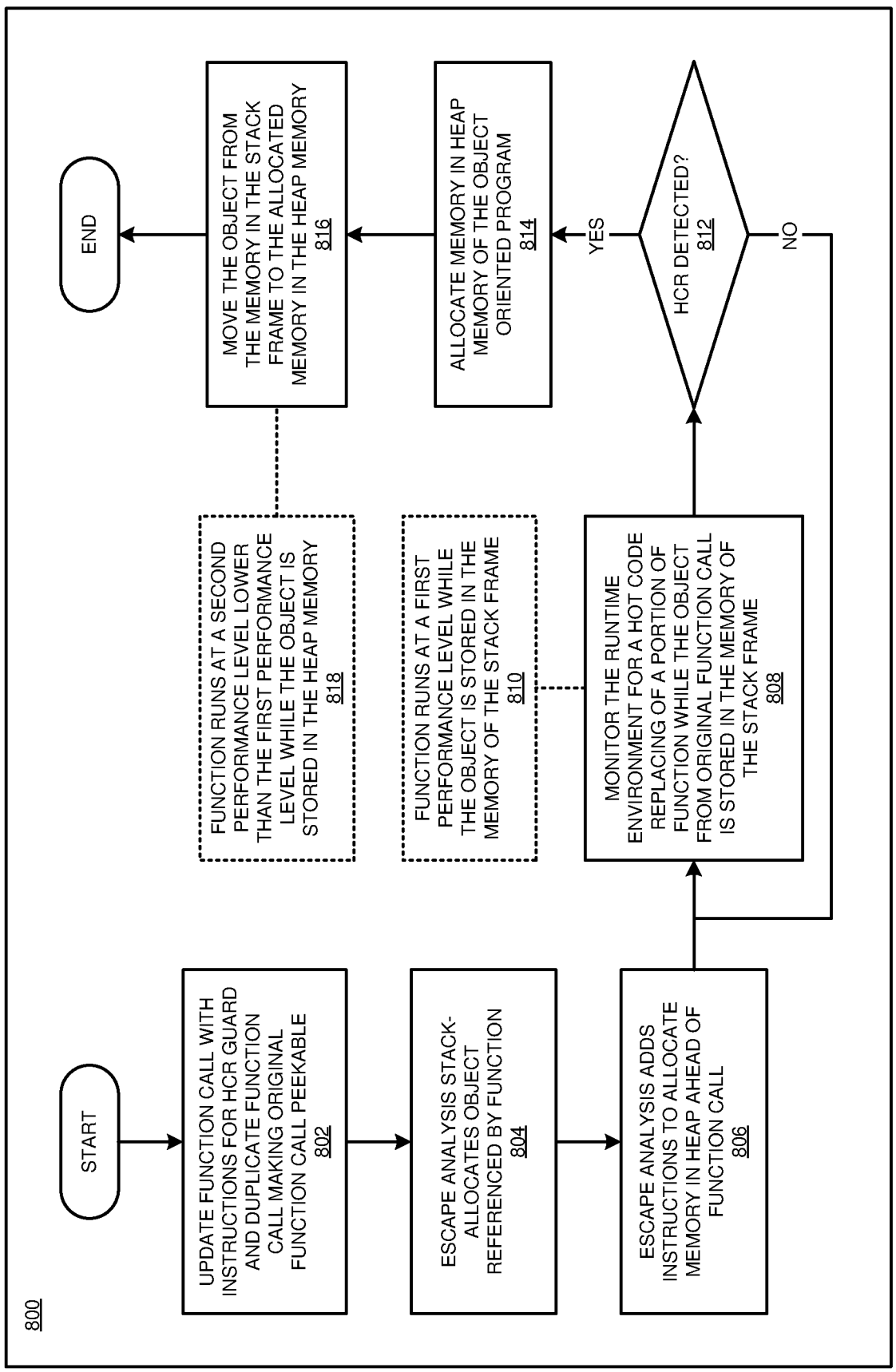

*FIGURE 9B*

```
obj = stack allocated object of A
...
if (check that foo has been redefined)
    obj = new A() // copy from the stack allocated object into the newly allocated
                  //    object on the heap before it escapes
...
foo(obj); // call can be peeked
...
```

11,397,568 B2

ESCAPE ANALYSIS SUPPORT FOR METHOD REDEFINITION

CROSS-REFERENCE TO RELATED APPLICATIONS

The present application is related to and claims priority to the following application, the entirety of which is incorporated by reference herein: U.S. Provisional patent Application Ser. No. 62/946,266, entitled "ESCAPE ANALYSIS SUPPORT FOR METHOD REDEFINITION", filed Dec. 10, 2019.

BACKGROUND

The present invention relates generally to a method, system, and computer program product for compiler optimization. More particularly, the present invention relates to a method, system, and computer program product for escape analysis support for method redefinition.

Programs written in an Object-Oriented Programming Language (OOPL) are composed of objects that are typically allocated to a particular block of memory referred to as the "heap." The heap typically includes a garbage collection mechanism that provides the convenience of handling memory reclamation by monitoring and removing objects that are no longer needed. This convenience relieves the programmer from having to determine how and when to destroy unneeded objects.

However, one problem with the heap allocation is that the users have less control over the program's performance. Each time an object is heap-allocated, a certain cost is incurred as the memory manager updates its data structures. Furthermore, an additional cost must be paid to reclaim the object during garbage collection. Although these costs are small when considered individually, the sheer frequency of object allocation and reclamation result in a significant portion of program execution time being spent in the memory manager, allocating and reclaiming memory for objects.

The performance costs associated with heap allocation can sometimes be avoided by applying a compiler optimization such as escape analysis. The goal of escape analysis as an optimization is to take object allocations that would normally be allocated to the heap and instead allocate those objects to the stack (i.e., stack allocation). When the object is stack-allocated, the memory is closer to the thread of execution, which is better for performance.

However, not all objects can be stack-allocated. Stack-allocated objects only live for the lifetime of the associated method call. For example, if a function is called and an object is allocated to the stack in the function's stack frame, when the function's execution is completed, the object will be deallocated (i.e., deleted) because the function and any parameters, local variables, etc. within the functions frame are all removed from the stack. If a pointer to the object is used after the object is deallocated, the application would malfunction. For this reason, escape analysis determines all the places where a pointer can be stored and whether the lifetime of the pointer can be proven to be restricted only to the current function, in which case the object may be a candidate for stack allocation.

SUMMARY

The illustrative embodiments provide for escape analysis support for method redefinition. An embodiment includes allocating, responsive to an instruction that creates an object in an object oriented program, memory in a stack frame for the object. The embodiment also includes detecting, during a runtime of the object oriented program, a hot code replacing of a portion of a function while the object is stored in the memory of the stack frame, where a thread of execution running the function holds the stack frame for the function including the object stored in the memory of the stack frame, and where the thread of execution runs the function at a first performance level while the object is stored in the memory of the stack frame. The embodiment also includes allocating, responsive to the detecting of the hot code replacing of the portion of the function, memory in a heap memory of the object oriented program. The embodiment also includes moving the object from the memory in the stack frame to the allocated memory in the heap memory of the object oriented program. The embodiment also includes updating a reference to the object pointing to the stack frame to instead point to the allocated memory in the heap memory, where the thread of execution runs the function at a second performance level lower than the first performance level while the object is stored in the heap memory. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 7B depicts exemplary modified code in accordance with an illustrative embodiment;

FIG. 7C depicts exemplary further modified code in accordance with an illustrative embodiment;

FIG. 8 depicts flowchart of an example process for heapifying stack-allocated objects in the event of an HCR in accordance with an illustrative embodiment;

FIG. 9B depicts exemplary modified code in accordance with an illustrative embodiment;

DETAILED DESCRIPTION

Figure 1:
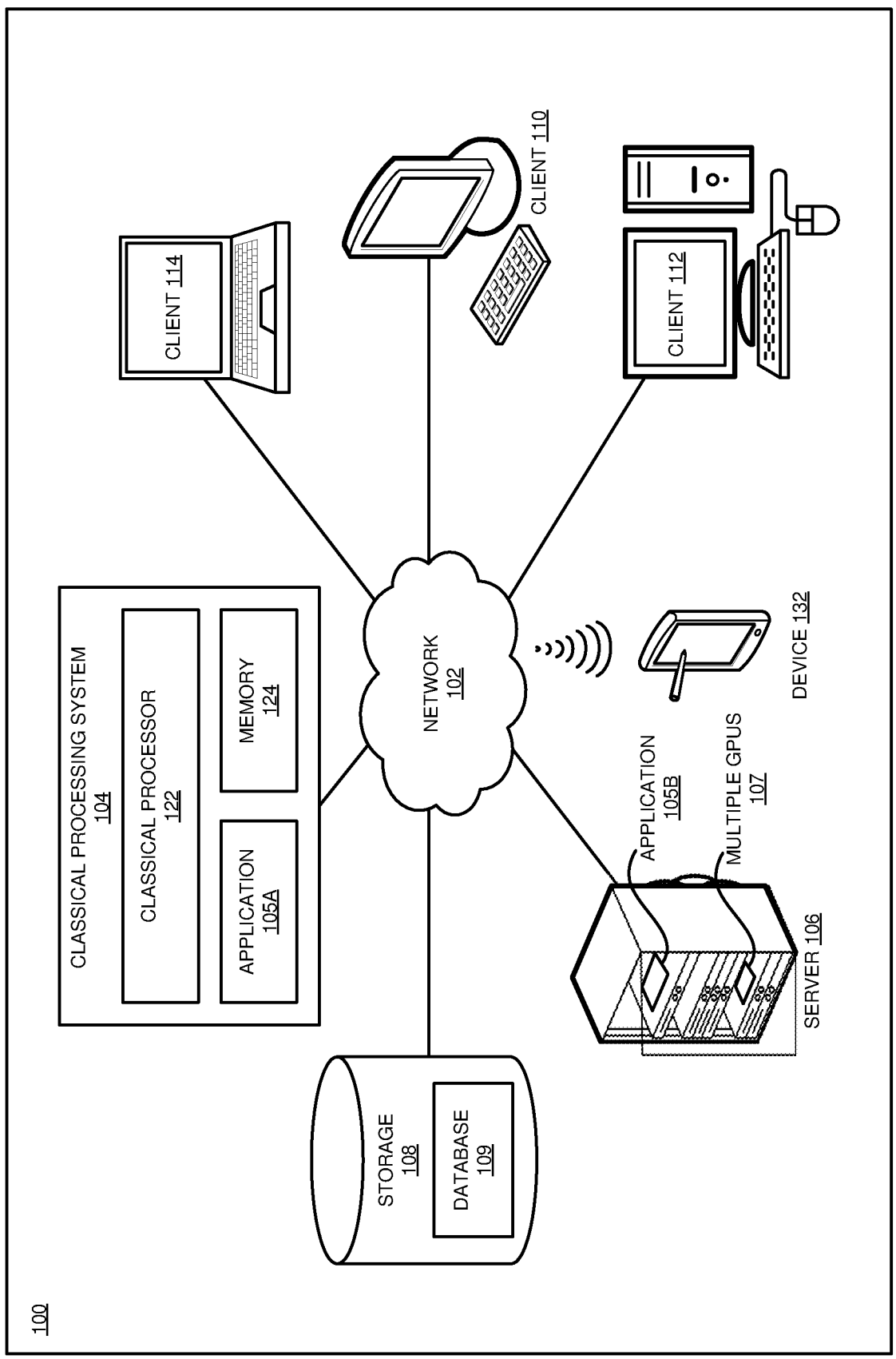
FIG. 1 depicts a block diagram of a network of data processing systems in which illustrative embodiments may be implemented.

Performance improvements to the functioning of software applications and hosting hardware continue to be highly desirable. Escape analysis is an effective technique for improving the performance of an OOPL application by identifying objects that can be stack allocated. An application can realize significant performance improvements by allocating objects to a stack rather than the heap.

However, allocating objects to the stack has been problematic in some situations. Stack allocated objects only persist for the duration of the calling function. If the function is called with an object stack-allocated in the function's stack frame, the function and object will be removed from the stack when the function is completed. However, if the object "escaped" the function, the missing object may present a problem. An object "escapes" a function or thread in which it was created if it is also accessed by other functions or threads. If another function points to the object that was stack-allocated and is gone, the missing object may cause the other function with the pointer to fail, and cause the application to malfunction.

A goal of escape analysis is to predict escapes and avoid stack-allocating objects that may escape. According to prior techniques, if the escape analysis were unable to make a prediction due to lack of information about a method or function, the assumption was that it could escape and the default memory allocation was heap allocation. The escape analysis could not safely stack allocate an object that escapes, but could safely heap-allocate an object that does or does not escape. Therefore, the safe option for an object when the likelihood for an escape was unknown was to heap allocate the object.

Another roadblock preventing the use of escape analysis optimization has been Hot Code Replacement (HCR). HCR is a feature supported by some runtime environments, for example some Java runtime environments (JREs). HCR provides the capability to allow an implementation of a method to be redefined at runtime, essentially replacing the method with another method. This means that if HCR is enabled, any method can change at any point while the application is running. This capability makes method calls unpredictable and in the past has prevented the compiler from making any assumptions about what a method call will do. If the system does not know anything about a particular call, the system had to assume it cannot do the optimization because the object could end up escaping. As a result, if HCR was enabled, any method had escape potential, and therefore was treated as not being eligible for stack allocation according to prior techniques.

The illustrative embodiments recognize, however, that an object can be safely allocated to the stack in an HCR-enabled environment by implementing a process that includes detecting an HCR that changes a function and, in response, reallocating any stack-allocated object(s) associated with the changed function to the heap. Thus, disclosed embodiments allow for escape analysis to operate in an environment using a programming language that supports object-oriented programming and where method definitions can be changed at runtime. For example, in illustrative embodiments, escape analysis is possible for a Java application that supports HCR. While embodiments described herein are described within the context of a JRE, other embodiments use other programming languages and have different ways of changing method definitions at runtime.

Some embodiments include transforming an application's code to implement an HCR guard, but some such embodiments differ from other such embodiments as to actions taken if the HCR guard fails. In some such embodiments, an application relies on a detecting if a method has been redefined, and if it has, the embodiment proceeds with some safe action. In some embodiments, an application experiences an increase in its amount of code due to the implementation of the HCR guard, which has the potential to adversely impact other optimizations. Therefore, the various embodiments disclosed herein have different cost-benefit trade-offs and form a spectrum of possible solutions such that particular embodiments may be chosen, for example depending on the length of the analysis involved, the complexity of the transform, the complexity of the runtime, and the desired performance.

In some embodiments, a compiler such as a JIT compiler receives and compiles code for a method of an application and in the process the compiler generates metadata associated with the compiled method. For example, in some embodiments, the metadata is saved in the heap memory and includes certain information about the compiled method, for example, the method's name, locations of objects called by the method, and locations where something is done to the code if certain events happen. In some such embodiments, HCR guards are included in that metadata. In some such embodiments, an implementation of an HCR guard includes the compiler generating an instruction stream that's recorded in memory and an instruction address stored in the metadata such that, if this method gets redefined, the instructions at this memory address will be overwritten with new instructions.

In some embodiments, the HCR guard is initially coded as a no-operation (NOP) instruction, programming language statement, or computer protocol command that does nothing. Every time the method is run (unless and until the method is re-defined by HCR) the HCR guard is processed as a NOP instruction and has no impact on the application. If the method gets redefined by HCR, as part of the method being redefined, there is a piece of code in the runtime system, such as the JVM runtime, that detects that the method is being re-defined, then searches for references to the method being re-defined, and then overwrites each of the NOPs with code to jump to fallback code. From that point on, when the runtime system calls the method, the system sees the jump to the fallback code instead of seeing the NOP, and the system runs the fallback code.

Some embodiments include transforming an application's code to duplicate a method call so that an escape analysis optimization process can "peek" into the method call. The term "peek" and variations thereof refers to an operation in which the code in a method is analyzed at compilation time to learn properties associated with the code in pursuit of better optimizing parts of the application that directly or indirectly call the peeked code.

In some embodiments, a process includes heapifying stack-allocated objects in the event of an HCR. Some such embodiments allow escape analysis to operate in an environment using a programming language that supports object-oriented programming and allows for method definitions to be changed at runtime. For example, in an embodiment, a Java application at runtime supports HCR, which allows an implementation of a method to be replaced with another method at runtime. Other embodiments use other programming languages that have different ways of changing method definitions at runtime.

In some embodiments, a process allocates memory in a stack frame for an object. For example, in some embodiments, an object is stack-allocated by a compiler as a result of escape analysis. In some such embodiments, the process monitors the runtime environment for a hot code replacement of a portion of a function while the object is stored in the stack. In some embodiments, the function runs at a first performance level while the object is stored in the memory of the stack. In some embodiments, the process periodically checks for an HCR or receives a notification in the event of an HCR. In some such embodiments, the process heapifies the object by allocating memory in the heap memory of the object oriented program. In some such embodiments, at the time when objects are stack allocated by the compiler, the metadata maintains a list of objects that are stack allocated. In some embodiments, when an HCR occurs, the process checks the list for objects that are going to be affected by the HCR to make sure that any of the objects that were stack-allocated at compile time but can now escape due to the HCR get moved to the heap. In some embodiments, the process allocates a chunk of memory on the heap and copies the contents of the object that are currently on the stack and moves it to the heap, and also updates all of the local variables or other things that could be pointing at that stack object and point them at the heap. The copy of the object on the stack then ceases to exist and is no longer used. In some embodiments, the function runs at a second performance level lower than the first performance level while the object is stored in the heap memory.

In an embodiment, a process updates a function call with instructions for an HCR guard and with a duplicate function call that makes the original function call peekable. In some such embodiments, the process stack-allocates an object referenced by the function as a result of escape analysis. In some such embodiments, escape analysis adds instructions to the function call to allocate memory in the heap for the duplicate function call. In some such embodiments, the process monitors the runtime environment for a hot code replacement of a portion of the function while the object is stored in the memory of the stack frame. In some such embodiments, if an HCR is detected, the process heapifies objects referenced by the redefined function and updates pointers to the objects to point to the heap instead of the stack. In some embodiments, the function runs at a first performance level while the object is stored in the memory of the stack frame, and in some such embodiments, the function runs at a second performance level lower than the first performance level while the object is stored in the heap memory.

In an embodiment, a process for heapifying stack-allocated objects in the event of an HCR performs an escape analysis that peeks a function call and, if it finds no code that escapes an object, the process updates the function call to include instructions to check for a class redefinition and to further include a conditional heap allocation. In some embodiments, the process monitors the runtime environment for a hot code replacement of a portion of the function while the object is stored in the memory of the stack frame. In some such embodiments, if an HCR is detected, the process moves the object from the memory in the stack frame to the allocated memory in the heap memory.

In an embodiment, a process uses a stack walk to find and heapify any stack-allocated objects coupled with a method invalidation to prevent methods from being executed until recompiled to account for a new method definition. In some such embodiments, a stack walker in the language runtime does heapification and fixup of local variables and registers pointing at stack allocated objects if a peeked method gets redefined. Thus, in some embodiments a stack walker is used instead of transforming code to add an HCR guard. In such embodiments, the process modifies the behavior of the virtual machine and runtime environment, rather than modifying the method or function, to compensate for methods or functions being redefined.

In some embodiments, a compiler performs escape analysis, including peeking (or otherwise analyzing code) to check if the method causes any objects to escape. If so, in some embodiments the analysis stores tracking information about such peeked method calls in the heap metadata that is consulted at run time by a stack walker to check if any of the peeked methods are from a redefined class. In some embodiments, an HCR class redefinition only happens at a stop-the-world (STW) program point, meaning all threads are paused for a period of time while the HCR is performed. In some such embodiments, the language runtime's stack walker walks the stack of all application threads while they are not running. In some such embodiments, the stack walker is in charge of updating any local variable stack slots or registers holding references during STW program points and while a garbage collection (GC) occurs based on run-time metadata laid down by the compiler. In some such embodiments, the stack walker consults the metadata to check which stack slots and registers hold references that potentially point to objects that the GC might move, and updates them by calling into the GC to perform the updates for each such stack slot or register (if it was in fact moved). Thus, in some such embodiments, the stack walker determines which stack slots and registers hold references at any STW program point based on metadata written by the compiler. Therefore, in some such embodiments, the stack walker checks each such reference value at runtime and if the value happens to point at a stack allocated object, the stack walker allocates an object of the same class on the heap and copies the contents of the stack allocated object into the heap allocated object. In some such embodiments, if the value was pointing at a stack allocated object that was already heapified before, then the stack walker reuses the previously heap-allocated object to maintain object identity amongst stack slots and registers that were pointing at a stack allocated object.

Thus, in some embodiments, the stack walker checks when a class redefinition changes a method that was peeked during escape analysis. In some such embodiments, the stack walker heapifies objects that are affected by the redefinition to compensate for the redefinition at run time. In some embodiments, the heapification code is part of the native code for the stack walker that gets executed when a method peeked by escape analysis is redefined by an HCR or other such event. In some such embodiments, once the stack walker completes heapifications, any compiled methods that relied on the results of peeking the method that has been redefined are invalidated and not used. As a result, the invalidated methods will be recompiled. When the invalidated methods are recompiled, the compiler will again perform escape analysis and peek for code that causes any objects to escape. The peek will at this time be based on the new definition of the redefined method, and affected object will be heap-allocated.

In some embodiments, a process performs an escape analysis that peeks a function call. In some embodiments, if the escape analysis detects no escaping code, the process stack-allocates objects referenced by the function. In some embodiments, the process monitors the runtime environment for a hot code replacement of a portion of the function while the object is stored in the memory of the stack frame. In some embodiments, the process checks for an HCR, and if an HCR is detected, the process initiates a stack walker that walks the stack of each application thread during the HCR stop-the-world (STW) program point. In some embodiments, the process detects objects affected by the HCR based on metadata created by the compiler based on an escape analysis performed by the compiler. In some embodiments, the process moves objects affected by the HCR redefinition from the memory in the stack frame to the allocated memory in the heap memory. In some embodiments, the process instructs the garbage collection (GC) to update pointers that point to affected objects in stack slots or registers to instead point to respective heap copies of the affected objects.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
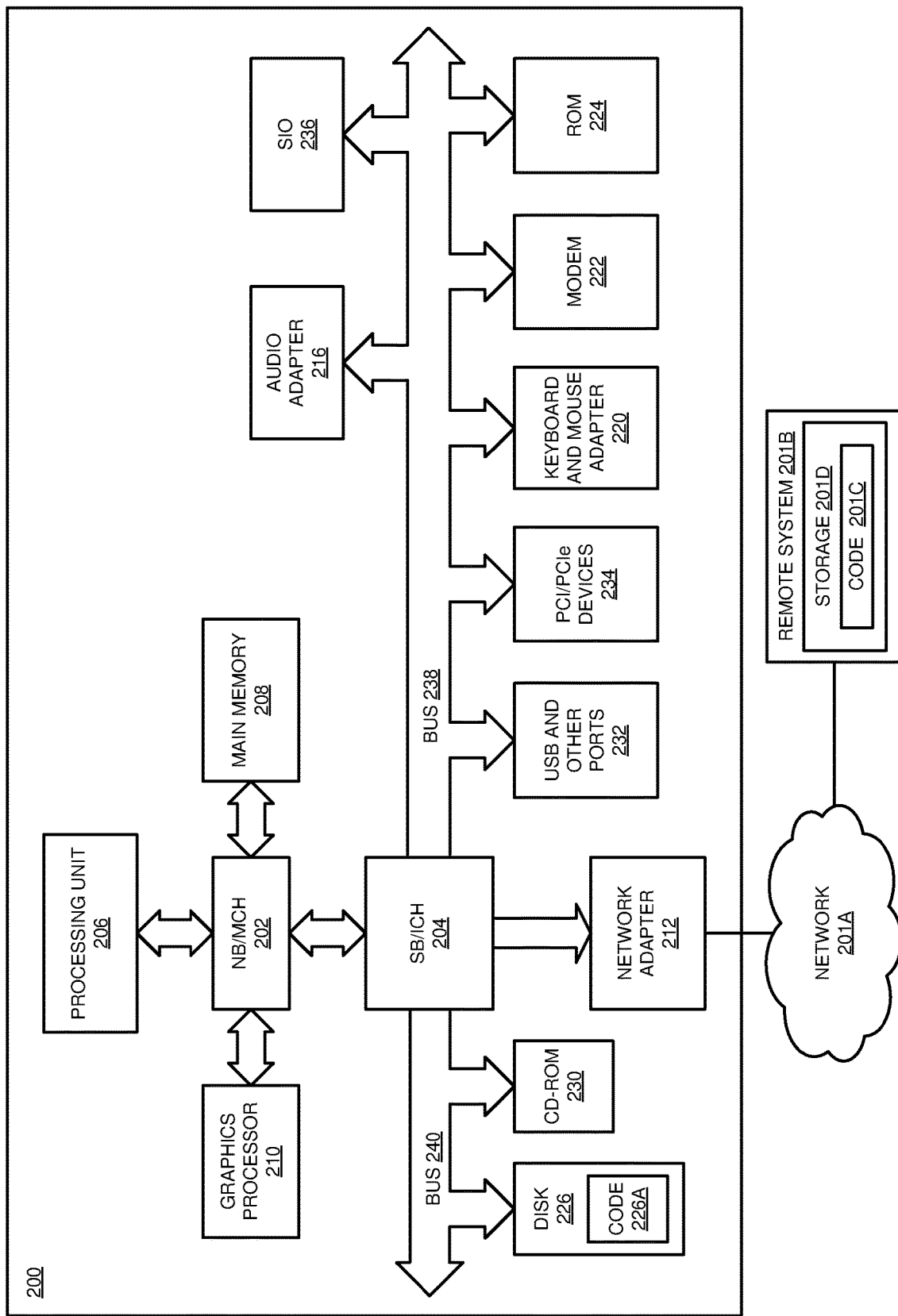
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by application 105B such as initiating processes described herein. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown. In an embodiment, server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
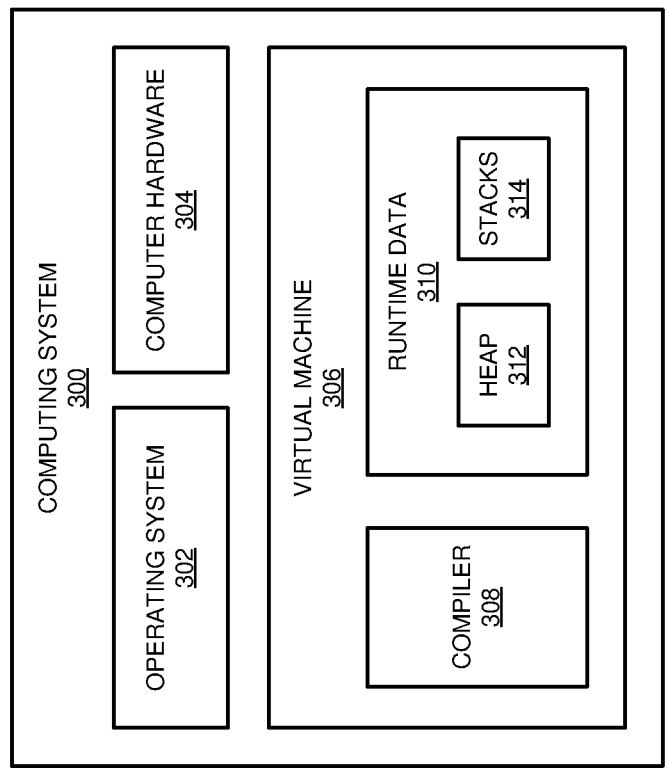
FIG. 3 depicts a block diagram of an example computing system in accordance with an illustrative embodiment.

With reference to FIG. 3, this figure depicts a block diagram of an example computing system 300 in accordance with an illustrative embodiment. The example embodiment includes a Java virtual machine 306 that includes a compiler 308 and runtime data 310 that perform enhanced compiler optimizations according to embodiments disclosed herein. Embodiments of the virtual machine 306 perform processes according to the flowcharts shown in FIG. 6, 8, 10, or 11. In an embodiment, the virtual machine 306 is an example of application 105A/105B of FIG. 1.

In some embodiments, the computing system 300 includes an operating system 302 running on computer hardware 304 and providing an operating environment for Java applications run by a Java Virtual Machine (JVM) 306. In some embodiments, the JVM 306 includes a compiler 308 that receives bytecode and translates it into a Java application using runtime data 310. The runtime data includes heap memory 312 and stacks memory 314. In some embodiments, the functionality described herein is distributed among a plurality of systems, which can include combinations of software and/or hardware based systems, for example Application-Specific Integrated Circuits (ASICs), computer programs, or smart phone applications.

In some embodiments, a particular optimization performed by the compiler 308 is escape analysis. A goal of escape analysis as an optimization is to take object allocations that would normally occur from the heap 312 and to allocate those objects from the stack 314. Allocating objects from the heap 312 is relatively expensive because the heap is shared memory, which potentially involves coordinating with other threads to make sure that memory is allocated correctly in the heap 312 that is not local to the thread of execution. Therefore, it is desirable to allocate as many objects as possible on the stacks 314 for improved performance.

Figure 4:
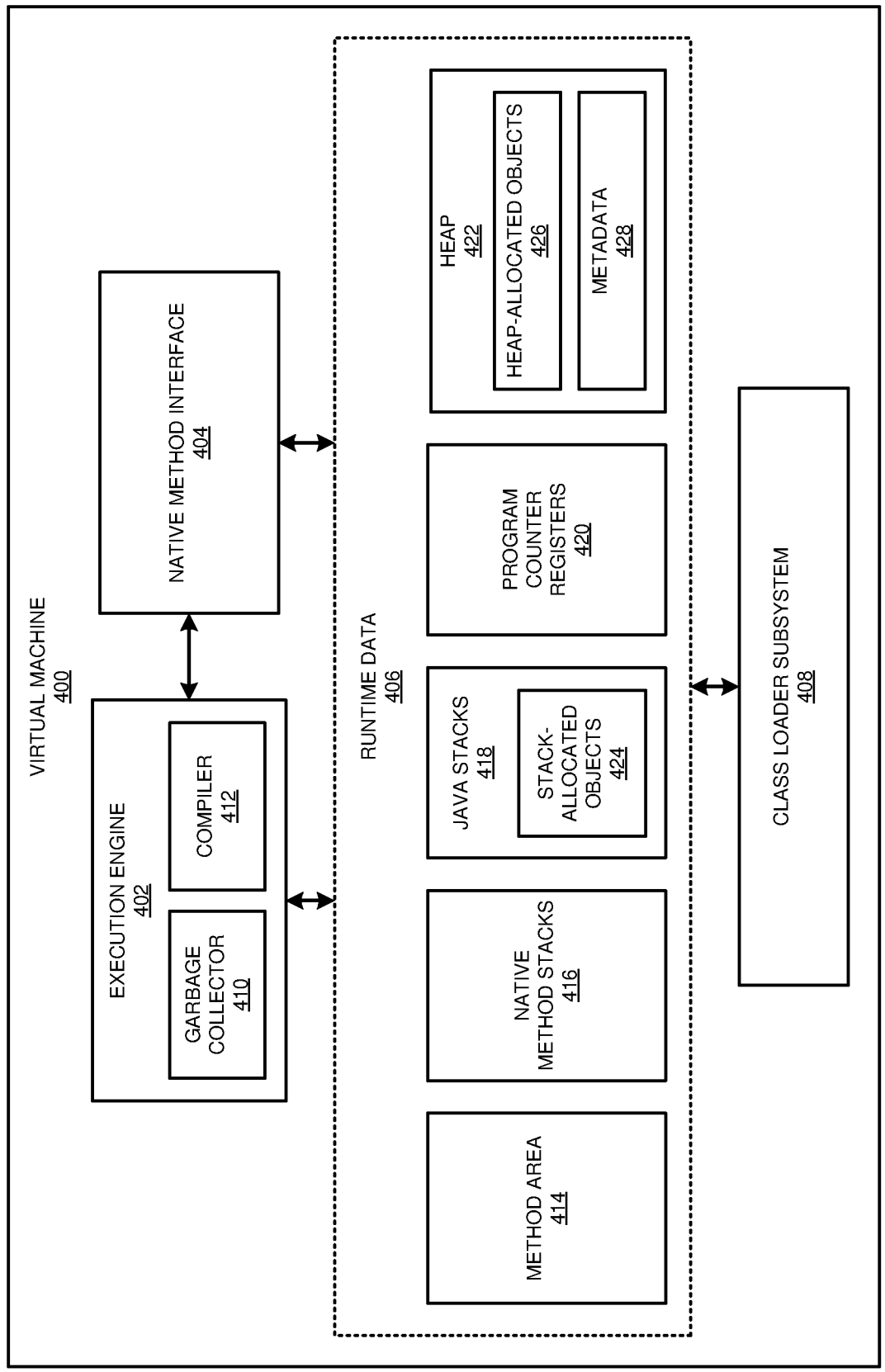
FIG. 4 depicts a block diagram of an example virtual machine or JVM in accordance with an illustrative embodiment.

With reference to FIG. 4, this figure depicts a block diagram of an example virtual machine or JVM 400 in accordance with an illustrative embodiment. The example embodiment includes a JVM 400, but alternative embodiments include other programming languages and corresponding architectures. In some embodiments, JVM 400 is an example of JVM 306 of FIG. 3. In some embodiments, JVM 400 perform processes according to the flowcharts shown in FIG. 6, 8, 10, or 11.

In some embodiments, JVM 400 includes execution engine 402, native method interface 404, runtime data 406, and class loader subsystem 408. In some embodiments, the execution engine 402 includes a garbage collector 410 and a compiler 412. In some embodiments, the runtime data includes method area 414, native method stacks 416, Java stacks 418, program count registers 420, and heap 422. The java stacks 418 include stack-allocated objects 424, and the heap includes heap-allocated objects 426 and metadata 428. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the class loader subsystem 408 is a component of the JVM 400 that provides a mechanism for loading the types, which are classes and interfaces, using fully qualified names. In some embodiments, the runtime data 406 represents space in memory used to store data, including bytecode, information extracted from previously loaded class files, objects instantiated by an executing program, parameters provided to methods, return values associated with executing programs, and local variables associated with executing programs. In some embodiments, the runtime data 406 is organized into a number of runtime data area, such as method area 414, native method stacks 416, Java stacks 418, program count registers 420, and heap 422, although the organization of the memory can vary in alternative embodiments.

In some embodiments, method area 414 represents a memory area that is shared by all threads running inside virtual machine 400. When virtual machine 400 loads a particular class file, the particular class file is parsed for information about a type from the binary data contained within the class file. The type information is loaded into method area 414. During program execution, virtual machine 400 stores all program instantiated objects onto heap 422 as heap-allocated objects 426, except for stack-allocated objects 424, and stores other data as metadata 428 in the heap 422.

In some embodiments, program counter registers 420 and Java stacks 418 are assigned to a new thread when the new thread is created. When the thread is executing a Java method, rather than a 'native method,' a value of program counter registers 420 is the next instruction for the thread to execute. Java stacks 418 store the state of Java method invocations, but not the 'native method,' invocations for the thread. The state of a Java method invocation typically includes local variables, invocation parameters, a return value when available and any intermediate calculation results from the method. Because the Java virtual machine does not have registers to hold data values as intermediate data, Java stacks 418 are used. The state of 'native method' invocations is stored in an implementation-dependent way in native method stacks 416, and implementation-dependent memory areas.

In some embodiments, execution engine 402 represents an execution component or processing component that provides a capability for executing the instructions contained in the methods of classes, loaded by class loader subsystem 408. In some embodiments, the native method interface 404 provide a capability to the virtual machine 400 to use native methods that are written using a Java programming language and have platform-specific data or processing requirements. In some embodiments, access to the native methods requires use of the native method interface 404 to enable processing using execution engine 402.

In some embodiments, the garbage collector 410 uses a process of reviewing current allocations of heap memory to identify particular objects in the heap memory that are in use and other particular objects in the heap memory that are not in use. The garbage collector 410 identifies objects not in use as candidates for removal and deletes such objects. In some embodiments, the garbage collector 410 operates according to a predetermined schedule. Alternatively, in some embodiments, the garbage collector 410 automatically initiates cleaning activity when heap usage exceeds a predetermined threshold. In some embodiments, the garbage collector 410 identifies objects as in use or referenced and infers that a program still maintains a pointer to that object, so the garbage collector 410 leaves the object in the heap.

In some embodiments, compiler 412 is a runtime component providing a capability of dynamic translation, which is compilation during execution of a program rather than prior to the execution. In some embodiments, compiler 412 comprises an interpreter and/or just-in-time (JIT) compiler that translates the Java bytecode to platform specific machine code. In some embodiments, the run time compilation operates as a combination of ahead-of-time compilation (AOT) and interpretation.

Figure 5:
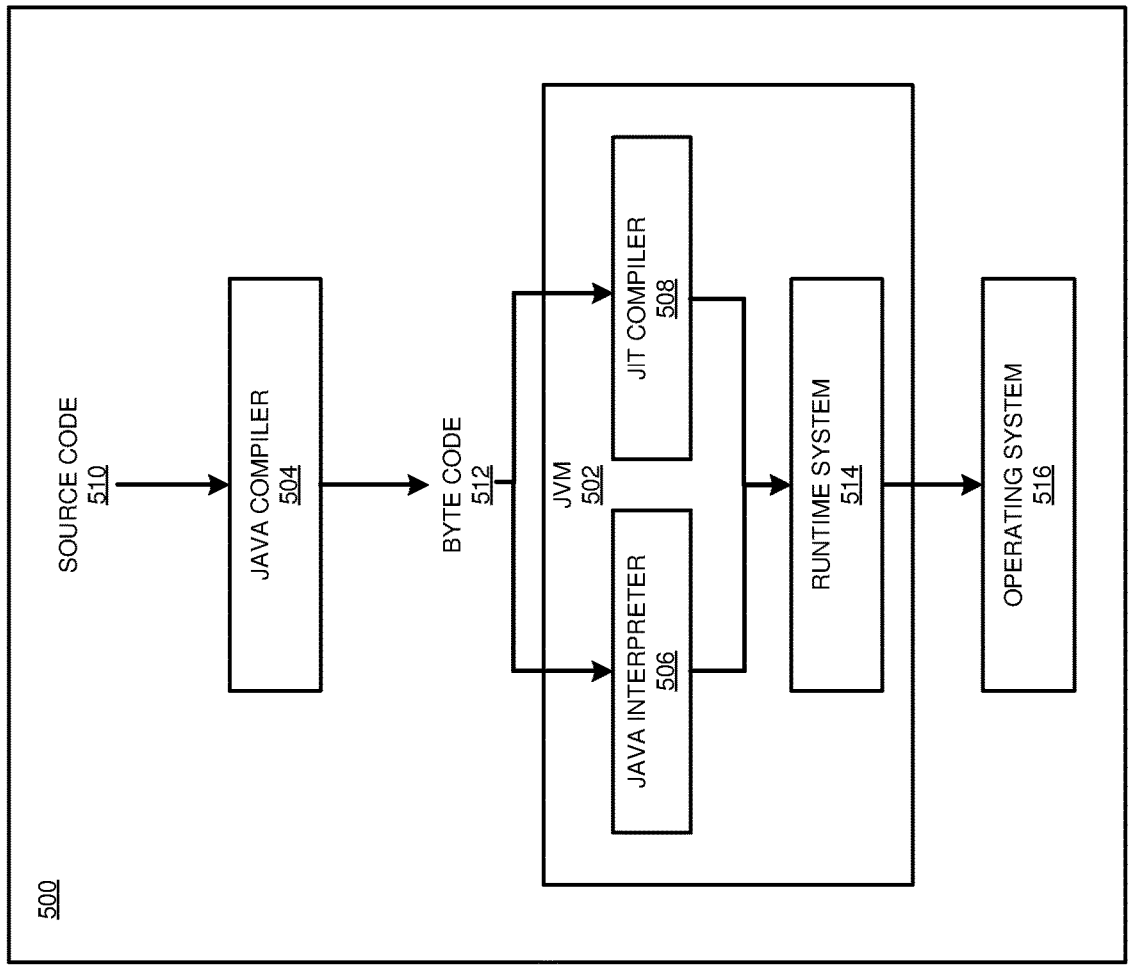
FIG. 5 depicts a block diagram of an example computing environment in accordance with an illustrative embodiment.

With reference to FIG. 5, this figure depicts a block diagram of an example computing environment 500 in accordance with an illustrative embodiment. This figure depicts an embodiment of a computing environment 500 that includes a JVM 502, but alternative embodiments include other programming languages and corresponding architectures. In some embodiments, JVM 502 is an example of JVM 306 of FIG. 3. In some embodiments, JVM 502 perform processes according to the flowcharts shown in FIG. 6, 8, 10, or 11.

The computing environment 500 includes a Java compiler 504, a JVM 502, and an operating system 516. The JVM 502 includes a Java interpreter 506, a Just In Time (JIT) compiler 508, and a runtime system 514. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the Java compiler 504 transforms source code 510 into bytecode 512. For example, in some embodiments, the source code comprises a .java file that is inputted to the Java compiler 504. The Java compiler 504 processes the .java file and outputs the bytecode as a .class file. In some embodiments, the JVM 502 receives the bytecode and inputs the bytecode into the Java interpreter 506 or JIT compiler 508, which output native machine code to the runtime system 514 and then to the operating system 516 for running the program. In some embodiments, the runtime system 514 is an example of the runtime data 406 of FIG. 4.

In some embodiments, the JVM 502 receives bytecode 512 and JIT compiler 508 transforms the bytecode into intermediate representations, also referred to as internal representations, which is what JIT compiler 508 analyzes, optimizes, and transforms into native machine code. For example, in some embodiments, the JIT compiler performs escape analysis to optimize performance by analyzing function calls for objects that can be stack allocated rather than heap allocated. In some embodiments, during optimization, JIT compiler 508 adds fallback paths by inserting HCR guards to the function calls.

Figure 6:
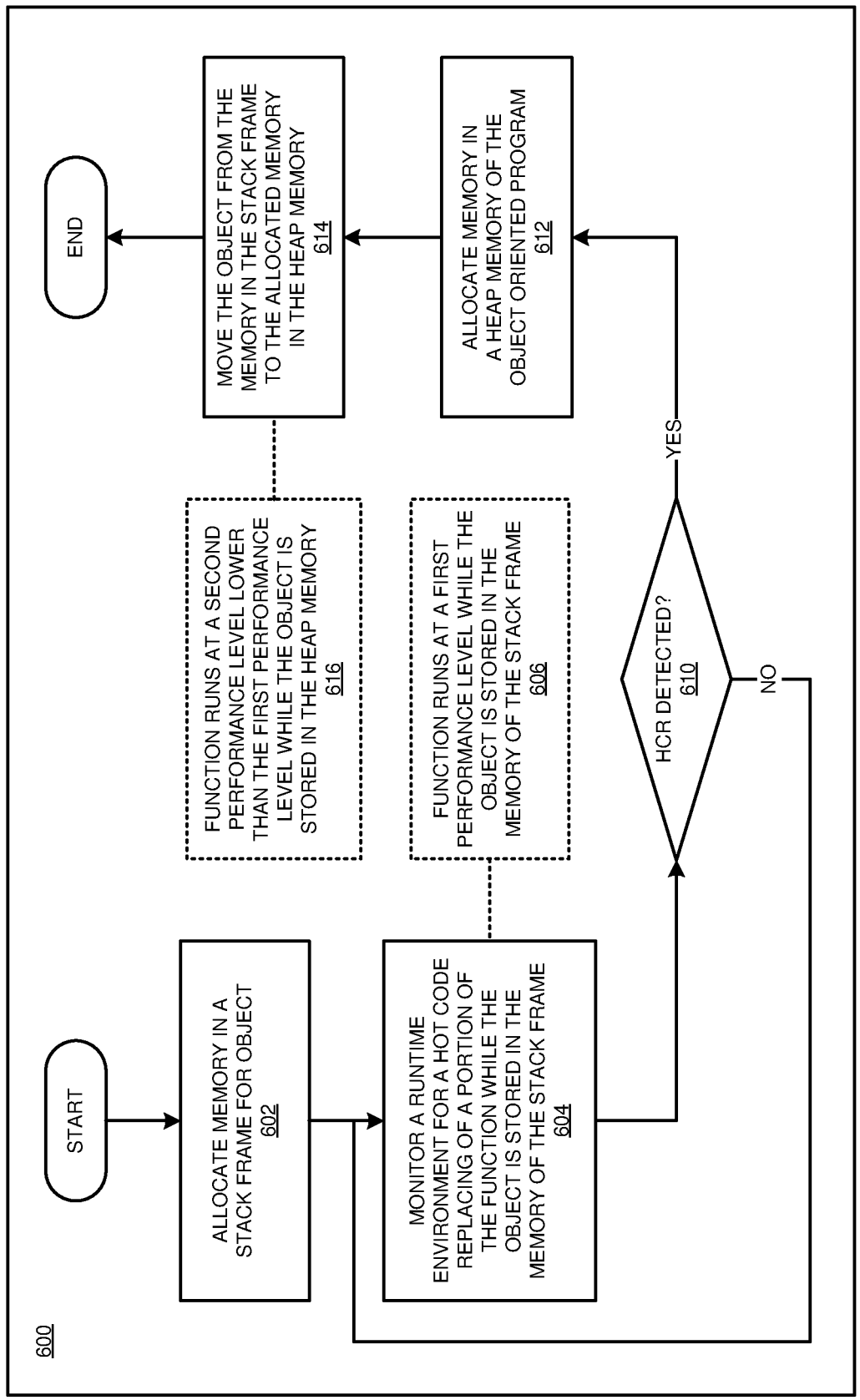
FIG. 6 depicts a flowchart of an example process for heapifying stack-allocated objects in the event of an HCR in accordance with an illustrative embodiment.

With reference to FIG. 6, this figure depicts a flowchart of an example process 600 for heapifying stack-allocated objects in the event of an HCR in accordance with an illustrative embodiment. Some such embodiments allow escape analysis to operate in an environment using a programming language that supports object-oriented programming and allows for method definitions to be changed at runtime. For example, in an embodiment, a Java application at runtime supports HCR, which allows an implementation of a method to be replaced with another method at runtime. Other embodiments use other programming languages that have different ways of changing method definitions at runtime. In a particular embodiment, the virtual machine 306, virtual machine 400, or applications 105A/105B carries out the process 600.

In an embodiment, at block 602, the process allocates memory in a stack frame for an object. For example, in some embodiments, the object is stack-allocated by the compiler as a result of escape analysis. At block 604, the process monitors the runtime environment for a hot code replacement of a portion of the function while the object is stored in the memory of the stack frame. As indicated at block 606, the function runs at a first performance level while the object is stored in the memory of the stack frame. At block 610, the process checks for an HCR, and either loops back to block 604 if no HCR is detected, or continues to block 612 if an HCR is detected.

At block 612, the process heapifies the object by allocating memory in the heap memory of the object oriented program. In some embodiments, at the time when objects are stack allocated by the compiler, the metadata maintains a list of objects that are stack allocated. In some embodiments, when an HCR occurs, the process checks the list for objects that are going to be affected by the HCR to make sure that any of the objects that were stack-allocated at compile time but can now escape due to the HCR get moved to the heap at block 614. In some embodiments, the process allocates a chunk of memory on the heap and copies the contents of the object that are currently on the stack and moves it to the heap, and also update all of the local variables or other things that could be pointing at that stack object and point them at the heap. The copy of the object on the stack then ceases to exist and is no longer used. In some embodiments, as indicated at block 616, the function runs at a second performance level lower than the first performance level while the object is stored in the heap memory.

Figure 7A:
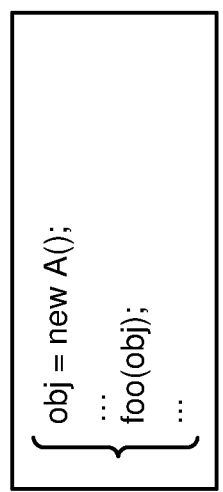
FIG. 7A depicts exemplary original code in accordance with an illustrative embodiment.

With reference to FIGS. 7A-7C, these figures show an example of code subjected to HCR guard revisions in accordance with an exemplary embodiment. In these figures, an HCR guard is implemented before a call, duplicates the call, and makes the call "peekable." The code shown in FIGS. 7A-7C is shown as a simple, non-limiting example provided for clarity purposes. FIG. 7A shows original code for creating an object obj, followed by a function foo calling obj as a parameter. In this case, obj is assumed to escape via foo if the compiler cannot peek into the call to foo at compile time.

However, in this situation, in some embodiments the compiler transforms the code to the code shown in FIG. 7B, where the function call foo is duplicated, and the first call is made peekable. Once compiler has modified the code in this way, the implementation of foo at compile time can be peeked because if foo has been redefined, the first instance of foo will be bypassed. Thus, the first instance of foo is only called if it has not changed. This means that effectively the first instance of foo cannot be changed (i.e., cannot be called if foo has changed), making it peekable. Thus, the peekable first call can be analyzed to check if it causes obj to escape. If obj does not escape anywhere in the code that can be analyzed (including calls that can be peeked), it can be stack allocated.

On the other hand, the class definition of foo can actually change at runtime by an HCR, and therefore the second foo call cannot be peeked. The purpose of the second foo call is to represent the fact that foo can change at run time and therefore the call cannot be peeked. If the class containing foo is redefined, then the condition check that was added would fail and the second foo would be called (the foo on the else path out of the condition).

In some embodiments, the second foo call is marked cold to trigger a particular capability of the escape analysis optimization, which ensures functional correctness. Escape analysis has the capability to "heapify" a stack-allocated object if there is a chance that it might escape on a code path. Heapification means allocation on the heap and copying the contents of the stack-allocated object into the heap-allocated object, but it only does this if the escape point is considered cold. The reason for this is that it is undesirable to have frequent heapification processes occurring because of the negative effect heapification has on the performance of the application due to the processor burden involved and because it undoes stack allocation after attempting it, which is even worse than simply leaving the object heap-allocated.

By making the second call cold and not peekable, it looks like a cold escape point to escape analysis, which responds by transforming it to the code shown in FIG. 7C. By doing this transformation, escape analysis has done stack allocation while still ensuring functional correctness should foo get redefined in the future, since any such redefinition would activate the else path where we heap allocate the object at or before the time when the redefined method foo is called.

With reference to FIG. 8, this figure depicts a flowchart of an example process 800 for heapifying stack-allocated objects in the event of an HCR in accordance with an illustrative embodiment. Some such embodiments allow escape analysis to operate in an environment using a programming language that supports object-oriented programming and allows for method definitions to be changed at runtime. For example, in an embodiment, a Java application at runtime supports HCR, which allows an implementation of a method to be replaced with another method at runtime. Other embodiments use other programming languages that have different ways of changing method definitions at runtime. In a particular embodiment, the virtual machine 306, virtual machine 400, or applications 105A/105B carries out the process 800.

In an embodiment, at block 802, the process updates a function call with instructions for an HCR guard and with a duplicate function call that makes the original function call peekable. For example, in some embodiments, the function call is updated as shown in FIGS. 7A and 7B and discussed above. Next, at block 804, the process stack-allocates an object referenced by the function by the compiler as a result of escape analysis. At block 806, escape analysis adds instructions to the function call to allocate memory in the heap ahead of the function call. For example, in some embodiments, the function call is updated as shown in FIGS. 7B and 7C and discussed above. In some embodiments, alternative code can be used if the alternative code causes the object to be moved from the stack to the heap before the function call happens so that the called function does not receive a pointer to the stack object. At block 808, the process monitors the runtime environment for a hot code replacement of a portion of the function while the object is stored in the memory of the stack frame. As indicated at block 810, the function runs at a first performance level while the object is stored in the memory of the stack frame. At block 812, the process checks for an HCR, and either loops back to block 808 if no HCR is detected, or continues to block 814 if an HCR is detected.

At blocks 814 and 816, the process heapifies the object by allocating memory in the heap memory of the object oriented program at block 814 and then moving the object from the stack to the heap at block 816. As indicated at block 818, the function runs at a second performance level lower than the first performance level while the object is stored in the heap memory.

Figure 9A:
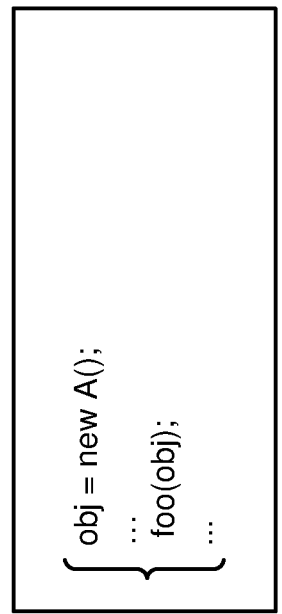
FIG. 9A depicts exemplary original code in accordance with an illustrative embodiment.

With reference to FIGS. 9A-9B, these figures show an example of code subjected to HCR guard revisions in accordance with an exemplary embodiment. In these figures, an HCR guard is implemented before a call, and an explicit call to heapify the object is added with a check for an HCR. The code shown in FIGS. 9A-9B is shown as a simple, non-limiting example provided for clarity purposes.

FIG. 9A shows original code for creating an object obj, followed by a function foo calling obj as a parameter. In this case, obj is assumed to escape via foo if the compiler cannot peek into the call to foo at compile time. However, in this situation, in some embodiments the compiler transforms the code to the code shown in FIG. 9B, where an HCR guard is used around an inline heapification of any stack allocated object which may reach a method call where peeking proved escape is not possible. Upon method redefinition the guard patches to force a stack allocated object to be copied to the heap before making the call to the new method.

Thus, the present embodiment implements an HCR guard before a call to explicitly heapify an object without duplicating the call. In some embodiments or situations, it may be difficult or undesirable to duplicate the call, for example where doing so may cause other problems for other optimizations because you have two calls and you have a merge in the control flow in the program and that confuses things. Therefore, rather than duplicate the call, in the present embodiment the process just adds a fake call that makes it appear to the compiler that objects will escape. As a result, the next time escape analysis is run, it heapifies anything that it needs to on the taken side of that guard. The fake call is removed next, leaving the guard that will heapify all the stack allocated objects. This makes it safe to do the stack allocation based on peeking the call even when HCR is possible. Again, if foo were redefined in the future, the code to do the heap allocation and assign it to obj would be executed thereby making it safe to pass the obj to the method foo.

Either of the techniques of FIGS. 7A-7C and of FIGS. 9A-9C can be employed to allow a peek of foo to occur, but one additional issue remains for other calls (say to bar) that might be in the code for foo. Any calls inside foo can still not be peeked unless foo is inlined into the method being compiled. This is because redefinition of bar can occur inside foo, and if bar was redefined at run time, then the results of the peek are still invalid and simply a check that foo has been redefined before calling foo would be not be enough to ensure functional correctness. Thus, in some embodiments, it may be beneficial to peek calls at more than a call depth of one.

Figure 10:
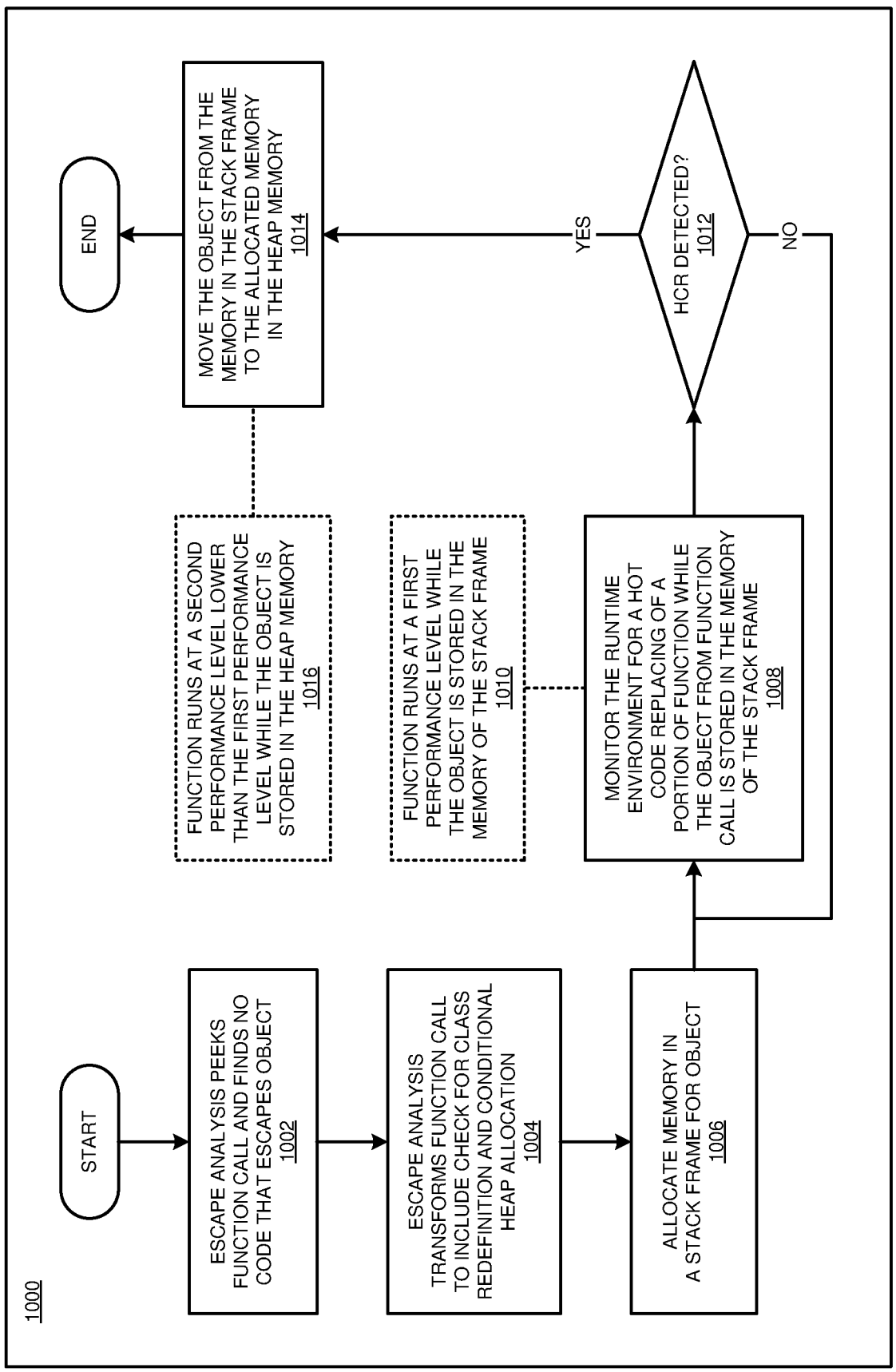
FIG. 10 depicts a flowchart of an example process for heapifying stack-allocated objects in the event of an HCR in accordance with an illustrative embodiment.

With reference to FIG. 10, this figure depicts a flowchart of an example process 1000 for heapifying stack-allocated objects in the event of an HCR in accordance with an illustrative embodiment. Some such embodiments allow escape analysis to operate in an environment using a programming language that supports object-oriented programming and allows for method definitions to be changed at runtime. For example, in an embodiment, a Java application at runtime supports HCR, which allows an implementation of a method to be replaced with another method at runtime. Other embodiments use other programming languages that have different ways of changing method definitions at runtime. In a particular embodiment, the virtual machine 306, virtual machine 400, or applications 105A/105B carries out the process 1000.

In an embodiment, at block 1002, the process performs an escape analysis that peeks a function call and finds no code that escapes a certain object. Next, at block 1004, the process updates the function call to include instructions to check for a class redefinition and to further include a conditional heap allocation. For example, in some embodiments, the function call is updated as shown in FIGS. 9A and 9B and discussed above. Next, at block 1006, the process allocates memory in a stack frame for the object.

At block 1008, the process monitors the runtime environment for a hot code replacement of a portion of the function while the object is stored in the memory of the stack frame. As indicated at block 1010, the function runs at a first performance level while the object is stored in the memory of the stack frame. At block 1012, the process checks for an HCR, and either loops back to block 1008 if no HCR is detected, or continues to block 1014 if an HCR is detected.

At block 1014, the process moves the object from the memory in the stack frame to the allocated memory in the heap memory. As indicated at block 1016, the function runs at a second performance level lower than the first performance level while the object is stored in the heap memory.

Figure 11:
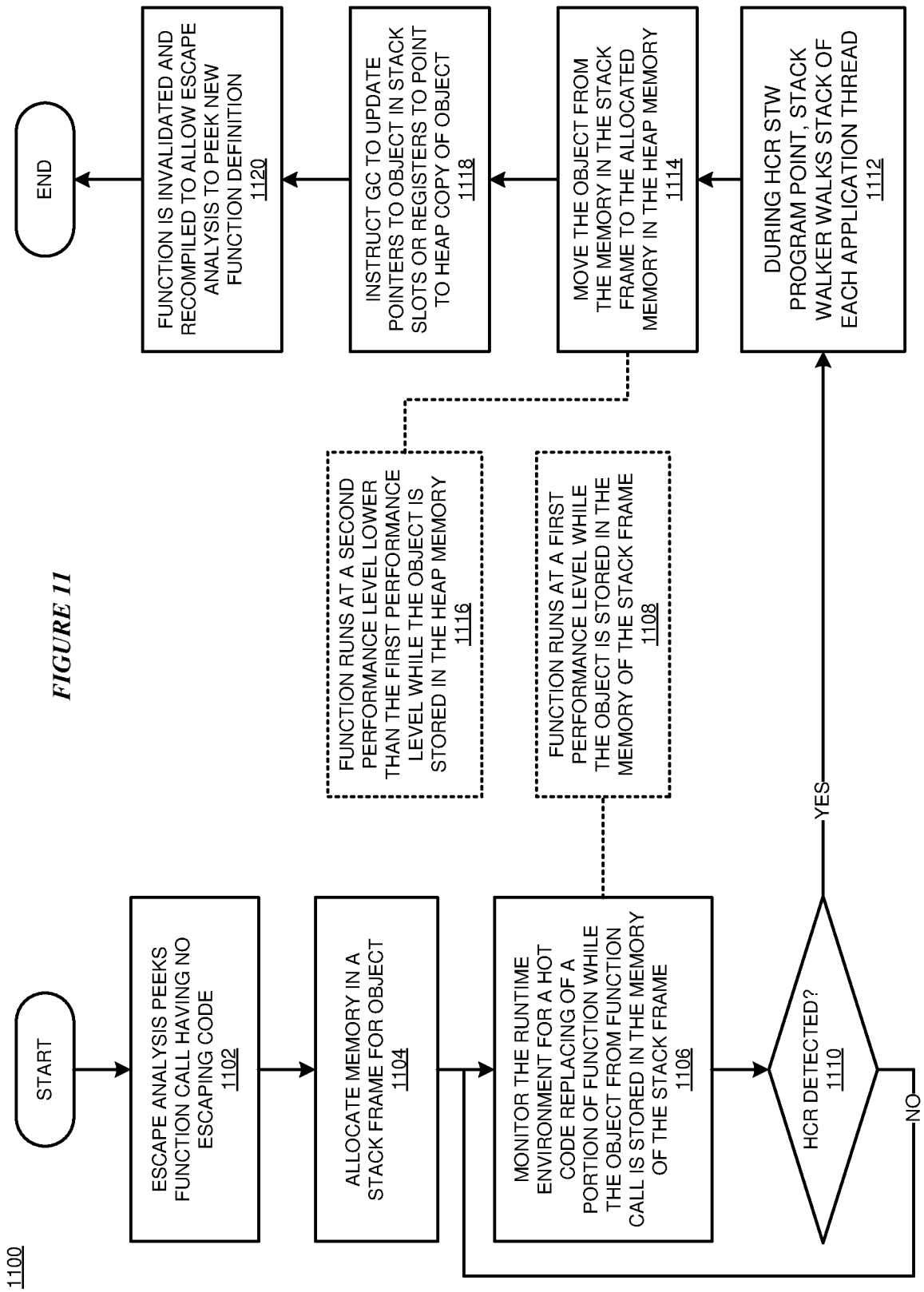
FIG. 11 depicts a flowchart of an example process for heapifying stack-allocated objects in the event of an HCR in accordance with an illustrative embodiment.

With reference to FIG. 11, this figure depicts a flowchart of an example process 1100 for heapifying stack-allocated objects in the event of an HCR in accordance with an illustrative embodiment. Some such embodiments allow escape analysis to operate in an environment using a programming language that supports object-oriented programming and allows for method definitions to be changed at runtime. For example, in an embodiment, a Java application at runtime supports HCR, which allows an implementation of a method to be replaced with another method at runtime. Other embodiments use other programming languages that have different ways of changing method definitions at runtime. In a particular embodiment, the virtual machine 306, virtual machine 400, or applications 105A/105B carries out the process 1100.

In an embodiment, at block 1102, the process performs an escape analysis that peeks a function call having no escaping code. Next, at block 1104, the process allocates memory in a stack frame for an object. Next, at block 1106, the process monitors the runtime environment for a hot code replacement of a portion of the function while the object is stored in the memory of the stack frame. As indicated at block 1108, the function runs at a first performance level while the object is stored in the memory of the stack frame. At block 1110, the process checks for an HCR, and either loops back to block 1106 if no HCR is detected, or continues to block 1112 if an HCR is detected.

At block 1112, during the HCR stop-the-world (STW) program point, a stack walker walks the stack of each application thread. Next, at block 1114, the process moves the object from the memory in the stack frame to the allocated memory in the heap memory. Next, at block 1118, the process instructs the garbage collection (GC) to update pointers to object in stack slots or registers to point to heap copy of object as indicated at block 1116, the function runs at a second performance level lower than the first performance level while the object is stored in the heap memory. Next, at block 1120, the process is invalidated and recompiled to allow escape analysis to peek new function definition.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method, comprising:
 receiving an instruction that creates and requests execution of a first object in an object oriented program;
 updating a function call with guard instruction and a duplicate function call, wherein the duplicate function call makes the updated function call peekable and enables an escape analysis optimization to be applied by a compiler;
 performing the escape analysis optimization wherein the escape analysis optimization comprises:
  based on the updated function call, allocating, by the compiler, the first object to a stack frame in memory, wherein the first object is referenced by a function of the updated function call; and
  adding supplementary instructions to the updated function call to allocate a portion of heap memory, prior to executing the updated function call;
 subsequent to performing the escape analysis optimization, detecting, during a runtime of the object oriented program; a hot code replacing of a portion of the function while the first object is stored in the memory of the stack frame, wherein a thread of execution running the function holds the stack frame for the function including the first object stored in the memory of the stack frame, and wherein the thread of execution runs the function at a first performance level while the first object is stored in the memory of the stack frame;

identifying the first object as being affected by the hot code replacing of the portion of the function;

allocating, responsive to identifying the first object as being affected by the hot code replacing of the portion of the function, memory in the heap memory of the object oriented program by processing the supplementary instructions;

moving the first object from the memory in the stack frame to the allocated memory in the heap memory;

updating a reference to the first object pointing to the stack frame to instead point to the allocated memory in the heap memory, wherein the thread of execution runs the function at a second performance level lower than the first performance level while the first object is stored in the heap memory; and performing the duplicate function call based on the updated reference pointing to the allocated memory in the heap memory.

2. The method of claim 1, wherein the guard instruction is included in a metadata written to the heap memory by the compiler, prior to detecting the hot code replacing of the portion of the function.

3. The method of claim 2, further comprising generating instructions to mark the duplicate function call cold.

4. The method of claim 1, further comprising generating instructions to cause stack-allocated objects to be conditionally moved to the heap memory if the function being called undergoes hot code replacement.

5. A computer usable program product for escape analysis support prior to method redefinition, the computer program product comprising one or more computer readable storage media, and program instructions collectively stored on the one or more computer readable storage media, the program instructions executable by a processor to cause the processor to perform operations comprising:

receiving an instruction that creates and requests execution of a first object in an object oriented program;

updating, a function call with guard instruction and a duplicate function call, wherein the duplicate function call makes the updated function call peekable and enables an escape analysis optimization to be applied by a compiler;

performing the escape analysis optimization, wherein the escape analysis optimization comprises:

based on the updated function call, allocating, by the compiler, the first object to a stack frame in memory, wherein the first object is referenced by a function of the updated function call; and adding supplementary instructions to the updated function call to allocate a portion of heap memory, prior to executing the updated function call;

subsequent to performing the escape analysis optimization, detecting, during a runtime of the object oriented program, a hot code replacing of a portion of the function while the first object is stored in the memory of the stack frame, wherein a thread of execution running the function holds the stack frame for the function including the first object stored in the memory of the stack frame, and wherein the thread of execution runs the function at a first performance level while the first object is stored in the memory of the stack frame;

identifying the first object as being affected by the hot code replacing of the portion of the function;

allocating, responsive to identifying the first object as being affected by the hot code replacing of the portion of the function, memory in the heap memory of the object oriented program by processing the supplementary instructions;

moving the first object from the memory in the stack frame to the allocated memory in the heap memory;

updating a reference to the first object pointing to the stack frame to instead point to the allocated memory in the heap memory, wherein the thread of execution runs the function at a second performance level lower than the first performance level while the first object is stored in the heap memory; and performing the duplicate function call based on the updated reference pointing to the allocated memory in the heap memory.

6. The computer usable program product of claim 5, wherein the stored program instructions are stored in a computer readable storage device in a data processing system, and wherein the stored program instructions are transferred over a network from a remote data processing system.

7. The computer usable program product of claim 5, wherein the stored program instructions are stored in a computer readable storage device in a server data processing system, and wherein the stored program instructions are downloaded over a network to a remote data processing system for use in a computer readable storage device associated with the remote data processing system, the stored program instructions further comprising:

program instructions to meter use of computer usable code associated with the requested execution; and program instructions to generate an invoice based on the metered use.

8. The computer usable program product of claim 5, wherein the guard instruction is included in a metadata written to the heap memory by the compiler, prior to detecting the hot code replacing of the portion of the function.

9. The computer usable program product of claim 5, further comprising generating instructions to mark the duplicate function call cold.

10. The computer usable program product of claim 5, further comprising generating instructions to cause stack-allocated objects to be conditionally moved to the heap memory if the function being called undergoes hot code replacement.

11. A computer system comprising a processor and one or more computer readable storage media, and program instructions collectively stored on the one or more computer readable storage media, the program instructions executable by the processor to cause the processor to perform operations comprising:

receiving an instruction that creates and requests execution of a first object in an object oriented program;

updating a function call with guard instruction and a duplicate function call, wherein the duplicate function call makes the updated function call peekable and enables an escape analysis optimization to be applied by a compiler;

performing the escape analysis optimization, wherein the escape analysis optimization comprises:
   based on the updated function call, allocating, by the compiler, the first object to a stack frame in memory, wherein the first object is referenced by a function of the updated function call; and
   adding supplementary instructions to the updated function call to allocate a portion of heap memory, prior to executing the updated function call;

subsequent to performing the escape analysis optimization, detecting, during a runtime of the object oriented program, a hot code replacing of a portion of the function while the first object is stored in the memory of the stack frame, wherein a thread of execution running the function holds the stack frame for the function including the first object stored in the memory of the stack frame, and wherein the thread of execution runs the function at a first performance level while the first object is stored in the memory of the stack frame;

identifying the first object as being affected by the hot code replacing of the portion of the function;

allocating, responsive to identifying the first object as being affected by the hot code replacing of the portion of the function, memory in the heap memory of the object oriented program by processing the supplementary instructions;

moving the first object from the memory in the stack frame to the allocated memory in the heap memory;

updating a reference to the first object pointing to the stack frame to instead point to the allocated memory in the heap memory, wherein the thread of execution runs the function at a second performance level lower than the first performance level while the first object is stored in the heap memory; and performing the duplicate function cab based on the updated reference pointing to the allocated memory in the heap memory.

12. The computer system of claim 11, wherein the guard instruction is included in a metadata written to the heap memory by the compiler, prior to detecting the hot code replacing of the portion of the function.

13. The computer system of claim 11, further comprising generating instructions to mark the duplicate function call cold.

\* \* \* \* \*